United States Patent [19]
Matsubara et al.

[11] Patent Number: 5,982,127
[45] Date of Patent: Nov. 9, 1999

[54] SPRING DEVICE FOR BALANCING VERTICAL MOVEMENTS OF MULTI-JOINT ROBOT

[75] Inventors: Masanori Matsubara; Kiyoshi Wakaizumi, both of Tokyo, Japan

[73] Assignee: Janome Sewing Machine Co., Ltd., Japan

[21] Appl. No.: 09/173,371

[22] Filed: Oct. 15, 1998

[30] Foreign Application Priority Data

Oct. 17, 1997 [JP] Japan ..................................... 9-285287

[51] Int. Cl.⁶ ..................................................... B25J 19/00
[52] U.S. Cl. .......................... 318/568.11; 901/27; 901/48
[58] Field of Search ............................. 318/6, 34, 568.11, 318/632, 685, 696; 901/14, 15, 19, 23, 24, 27, 28, 29, 48

[56] References Cited

U.S. PATENT DOCUMENTS

| | | | |
|---|---|---|---|
| 4,598,598 | 7/1986 | Kring et al. ........................... | 74/89.15 |
| 4,705,447 | 11/1987 | Smith ..................................... | 414/590 |
| 4,827,791 | 5/1989 | Richter .................................... | 74/469 |
| 4,883,249 | 11/1989 | Garland ................................... | 248/566 |

*Primary Examiner*—Bentsu Ro
*Attorney, Agent, or Firm*—Morrison Law Firm

[57] ABSTRACT

A multi-joint robot is disclosed, wherein a mount structure is vertically moved by means of a drive mechanism including a vertical threaded shaft and a stepping motor for rotationally driving said threaded shaft, thereby to vertically move the mount structure along the threaded shaft between an upper most position and a lower most position. A balancing device for balancing the weight of the mount structure includes at least one or more tension coil springs, the tension coil spring having one end anchored to a bottom of the robot, the opposite end connected to the bracket of the mount structure and an intermediate part thereof put into slide engagement with the pulley means which is arranged at an upper part of said robot above said bracket of said mount structure, so that the tension coil spring or springs may be expanded when said mount structure is at a position below said upper most position.

6 Claims, 5 Drawing Sheets

SPRING DEVICE FOR BALANCING VERTICAL MOVEMENTS OF MULTI-JOINT ROBOT

BACKGROUND OF THE INVENTION AND RELATED STATEMENT

The invention relates to a spring device for balancing the vertical movements of amount structure of a multi-joint robot, and more particularly relates to a spring device including one or a plurality of tension coil springs for balancing the vertical movements of amount structure of a multi-joint robot, the mount structure having a predetermined weight and having a plurality of jointed operating parts mounted thereon. A conventional industrial multi-joint robot is disclosed in the same applicant's Japanese Utility Registration Application, laid open No. 6-74237 under the title "A Feed Mechanism of Robot", wherein tension coil springs are used to balance the vertical up and down movements of a mount structure of the multi-joint robot having a predetermined weight, so that the mount structure may be driven with a little output. Otherwise, it is generally known to utilize a weight for balancing the weight of the mount structure of the multi-joint robot. In this case, however, the inertia is an undesirable element, and further the device becomes bulky.

In order to effectively balance the up and down movements of the mount structure of the multi-joint robot, it is required to effectively utilize the tension coil springs having the specified properties. Namely the tensile load of the tension coil springs is approximately equivalent to the weight of the mount structure and further the tensile load is constant in the entire region where the mount structure is moved up and down. In order to satisfy such requirement, the tension coil springs are often lengthened even though the springs are bent at the intermediate part or parts thereof, and as the result, the device becomes bulky accordingly. It has been desired to make the robot mechanically compact and smaller while the mentioned requirement is satisfied.

SUMMARY OF THE INVENTION

The present invention has been provided to eliminate the defects and disadvantages of the prior art. Namely the invention relates to a multi-joint robot comprising a vertical threaded shaft, a mount structure having a bracket and operatively connected to said threaded shaft, a stepping motor for rotationally driving said threaded shaft for vertically moving said mount structure along said threaded shaft between an upper most position and a lower most position, balancing means including at least one or more tension coil spring(s) and pulley means, said tension coil spring(s) having one end anchored to a bottom of said robot, the opposite end connected to said bracket of said mount structure and an intermediate part thereof put into slide engagement with said pulley means which is arranged at an upper part of said robot above said bracket of said mount structure, so that said tension coil spring(s) or a series of springs may be expanded when said mount structure is at a position below said upper most position.

BRIEF DESCRIPTION OF THE DRAWINGS

FIG. 3 (B) is a side elevational schematic view of the robot, wherein a mount structure of the robot is moved up from a lower position;

DETAILED DESCRIPTION OF PREFERRED EMBODIMENT

Figure 1:
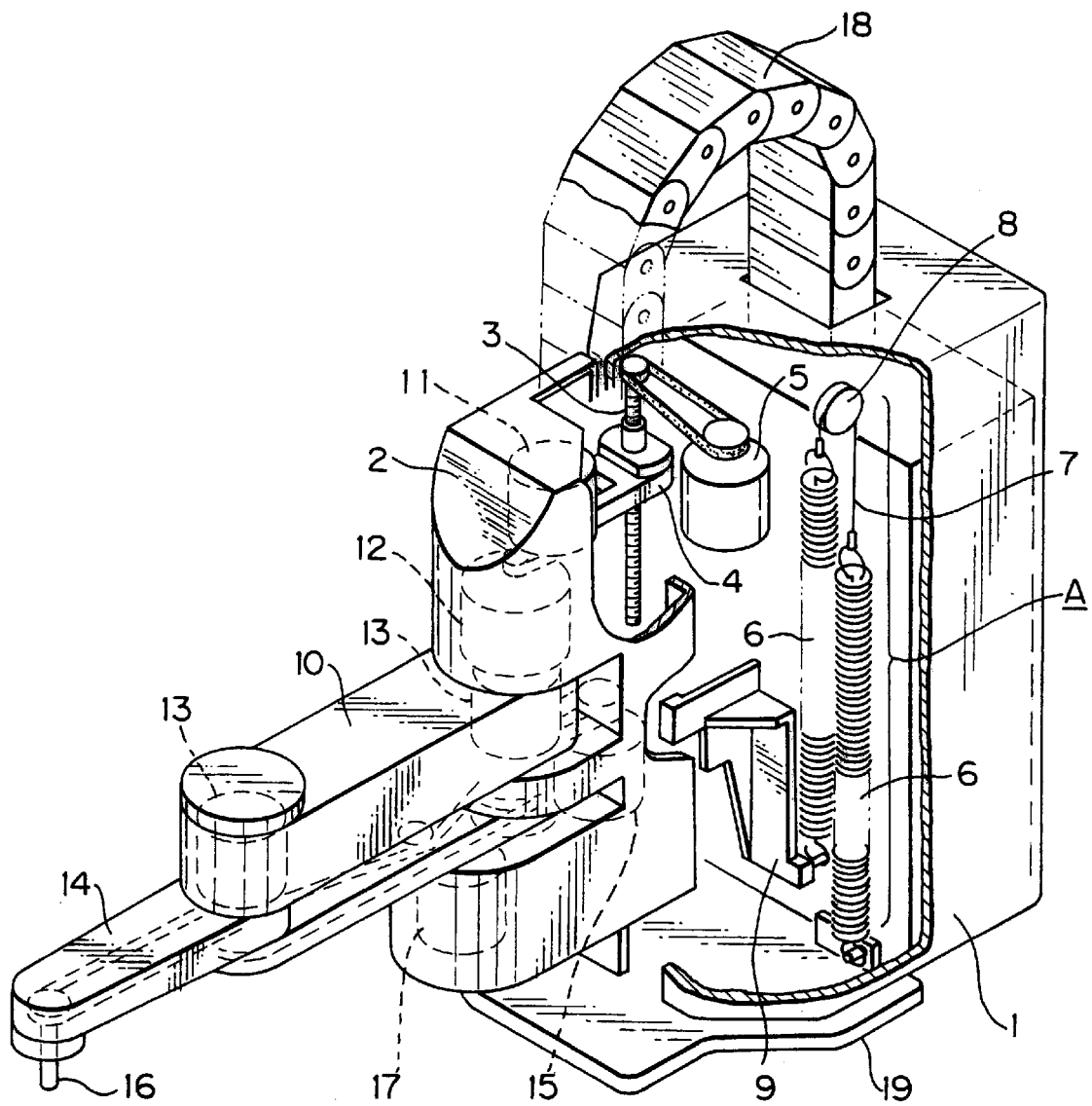
FIG. 1 is a perspective view of an embodiment of a multi-joint robot according to the invention illustrated partly broken to show the inner parts.

The invention will now be described in reference to the preferred embodiments as shown in the attached drawings. A robot 1 is of a stand-up type and has a mount structure 2 which is vertically moved up and down. The robot 1 has a threaded vertical shaft 3 rotatably arranged therein. A connector 4 has one end thereof fixed to the mount structure 2 and the opposite end connected to the threaded shaft 3 in threaded engagement therewith. A stepping motor 5 is provided in the robot 1 and is connected to the threaded shaft 3 through a transmission belt so that the rotation of the stepping motor 5 may be transmitted to the threaded shaft 3 and so that the rotation of the threaded shaft 3 may move the mount structure 2 vertically up and down therealong through the connector 4.

A plurality of tension coil springs, more precisely at least two tension coil springs 6 are provided in the robot 1. The springs 6 are connected in series with a wire 7 so as to function as a balancing device A for balancing the weight of the mount structure 2 during the vertical movements thereof with the springs in the series arranged in an elongated course. The spring balancing device A has one end of the course anchored to a bottom of the robot 1 and the opposite course end connected to a free end of a bracket 9. An intermediate part of the course, i.e., the connecting wire 7 of the spring balancing device A, which has a predetermined length, is in sliding engagement with a pulley 8 which is arranged at an upper position in the robot 1 so that the tension coil springs 6 may be in an expanded condition when the mount structure 2 remains at a lower position.

With respect to the spring balancing device A, the spring constant of the tension coil springs 6 represents a tensile load of the springs 6 which may be respectively deformed as required in dependence upon the load applied thereto. It is therefore preferable to make the spring constant smaller so as to reduce the tensile load of the springs. In this case, the diameter of the wire constituting the tension coil springs may be made smaller or the diameter of the coils may be made larger or the length of the respective tension coil springs may be made longer. In order to properly balance the weight of the mount structure 2, it is required to drive the mount structure 2 from up to down and from down to up with an approximately same output of the stepping motor 5. In other words, it is preferred to set the tensile load of the tension coil springs 6 so that the load applied to the stepping motor 5 may be approximately constant when the stepping motor 5 is driven to move the mount structure 2 from up to down and from down to up.

Figure 2:
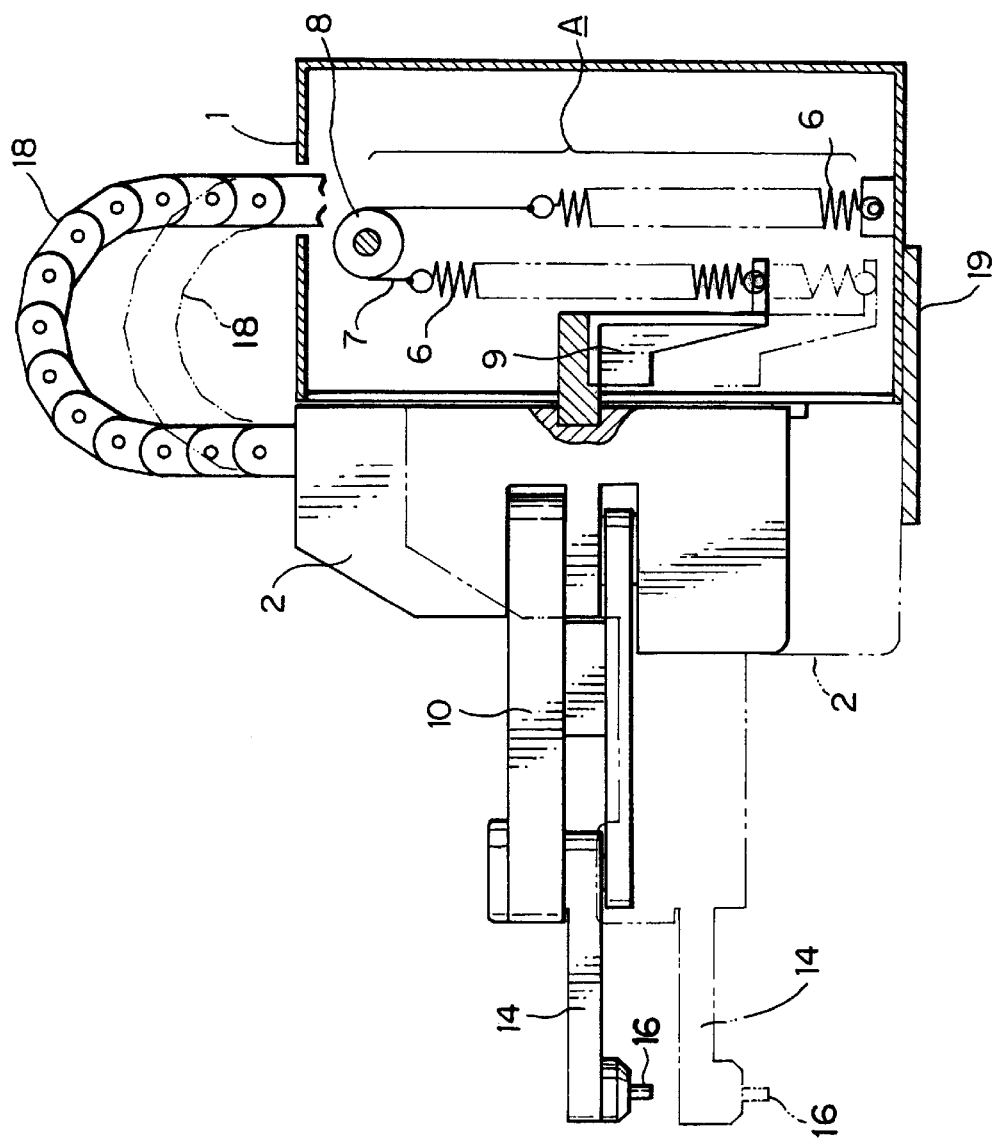
FIG. 2 is a side elevational view of the robot illustrated partly broken to show the inner parts.
Figure 3A:
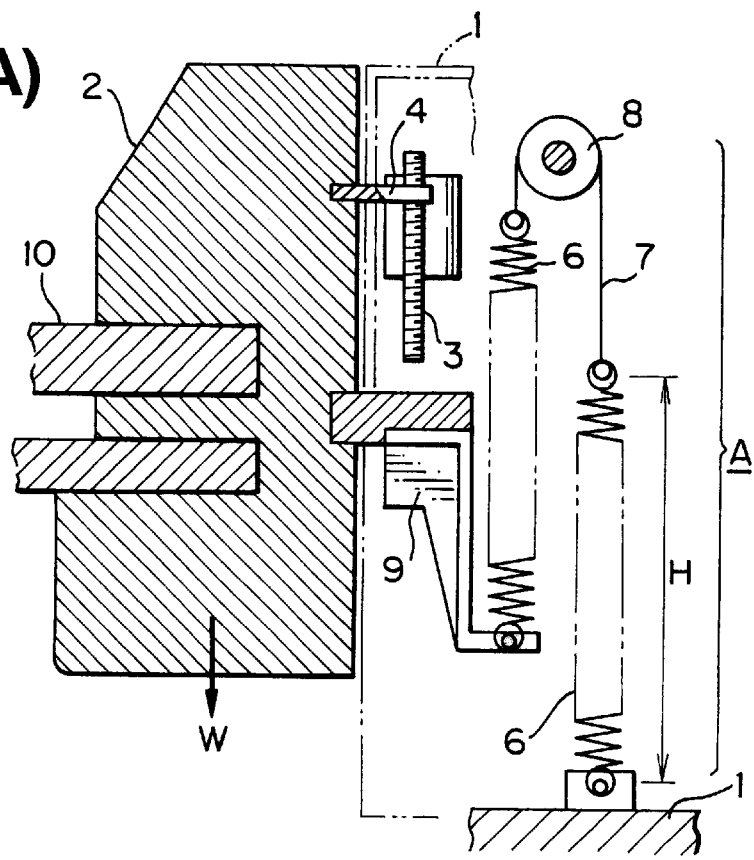
FIG. 3 (A) is a side elevational schematic view of the robot, wherein a mount structure of the robot is moved down from an upper position.
Figure 3B:
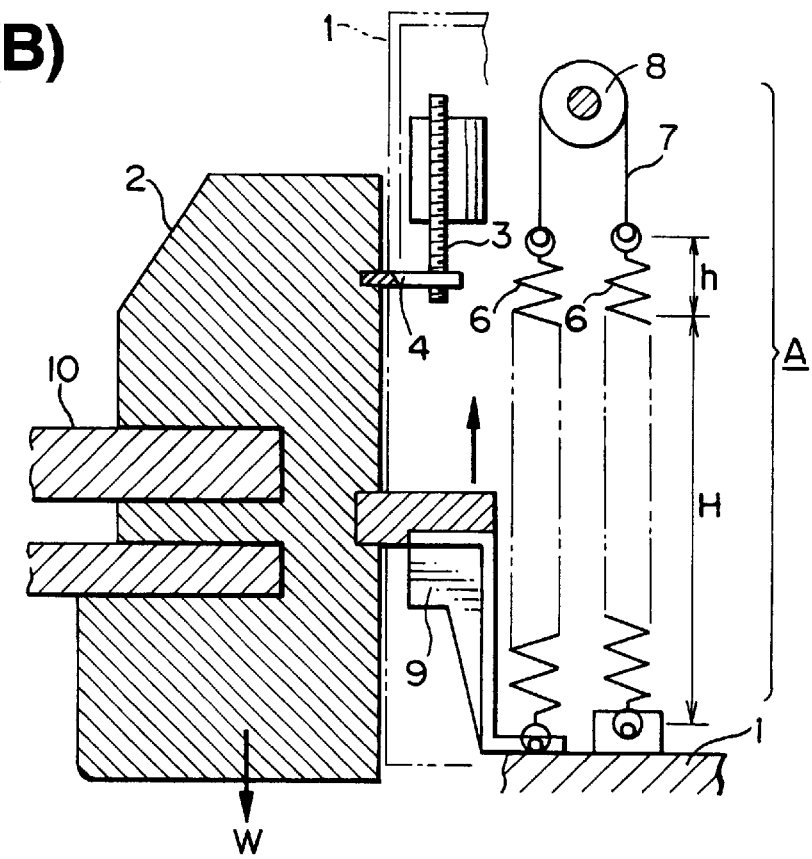

In reference to FIGS. 1 through 3 where a first embodiment of the invention is shown, the balancing device A comprises two tension coil springs 6 which are connected in series with the intermediate wire 7 of a predetermined length which is in slide engagement with the pulley 8 arranged at an upper position in the robot 1 while the series of tension coil springs 6 has one end anchored to the bottom of the robot 1 and the opposite end connected to free end of the bracket 9 which is fixed to the mount structure 2, the free end of the bracket 9 being located at a position below the pulley 8 while the mount structure 2 is at the upper most position or at the lower most position. The two tension wires 6 are made of a wire having a predetermined diameter, coils of a same diameter and a same unit length.

Figure 4:
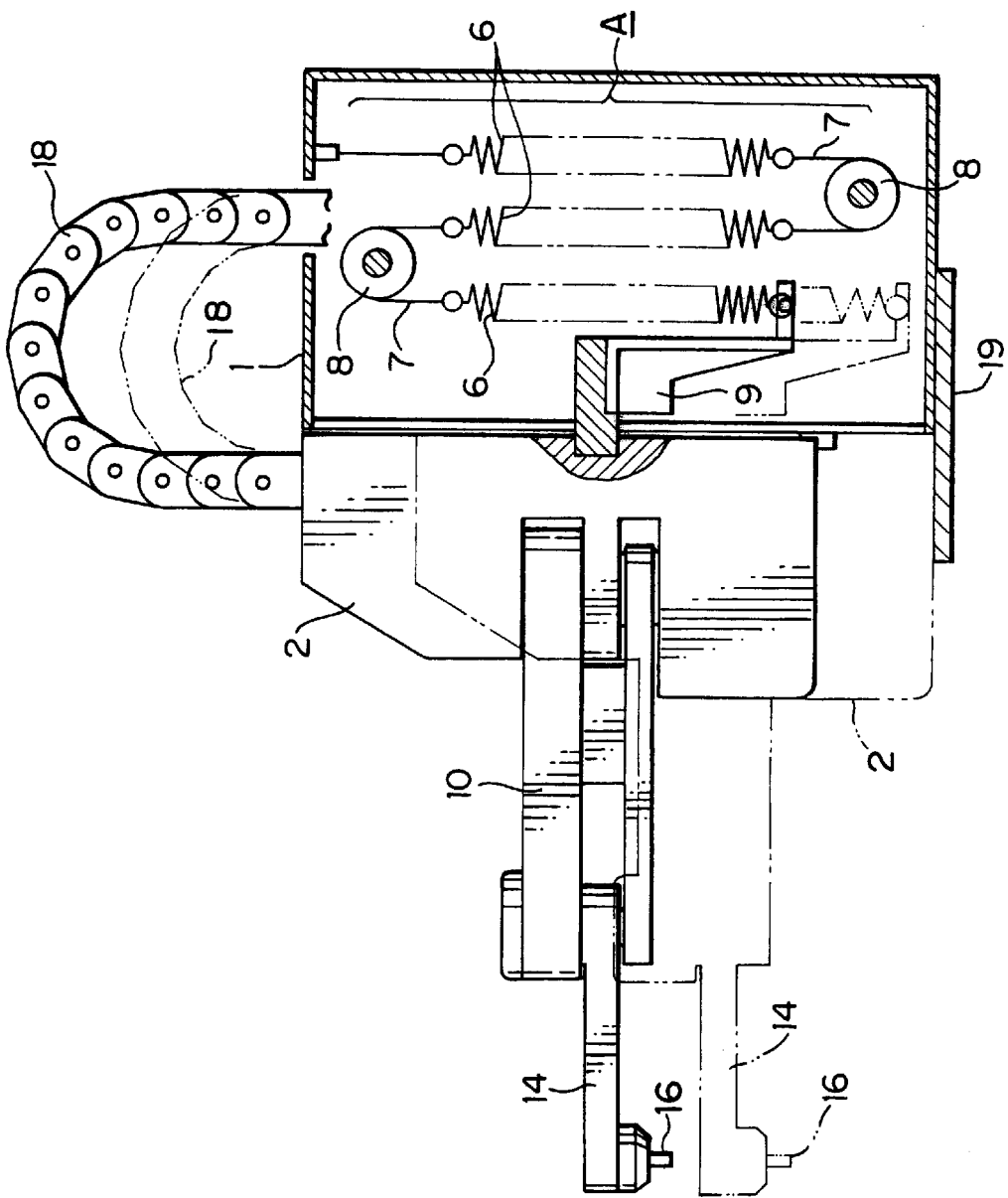
FIG. 4 is a side elevational view of a second embodiment of a multi-joint robot according to the invention illustrated partly broken to show the inner parts thereof.

In reference to FIG. 4. where a second embodiment of the invention is shown, the balancing device A comprises three tension coil springs 6 which are connected in series with first and second intermediate wires 7 of a predetermined length. As shown, the first intermediate wire 7 is in slide engagement with a first pulley 8 which is arranged at an upper position in the robot 1 and the second intermediate wire 7 is in slide engagement with a second pulley 8 which is arranged at a lower position in the robot 1 while the series of tension coil springs 6 has one end anchored to the top of the robot 1 and the opposite end connected to free end of the bracket 9 which is fixed to the mount structure 2, the free end of the bracket 9 being located at a position below the first pulley 8 which is arranged at the upper position while the mount structure 2 is at the upper most position or at the lower most position. The three tension wires 7 are made of a wire having a predetermined diameter, coils of a same diameter and a same unit length.

Figure 5:
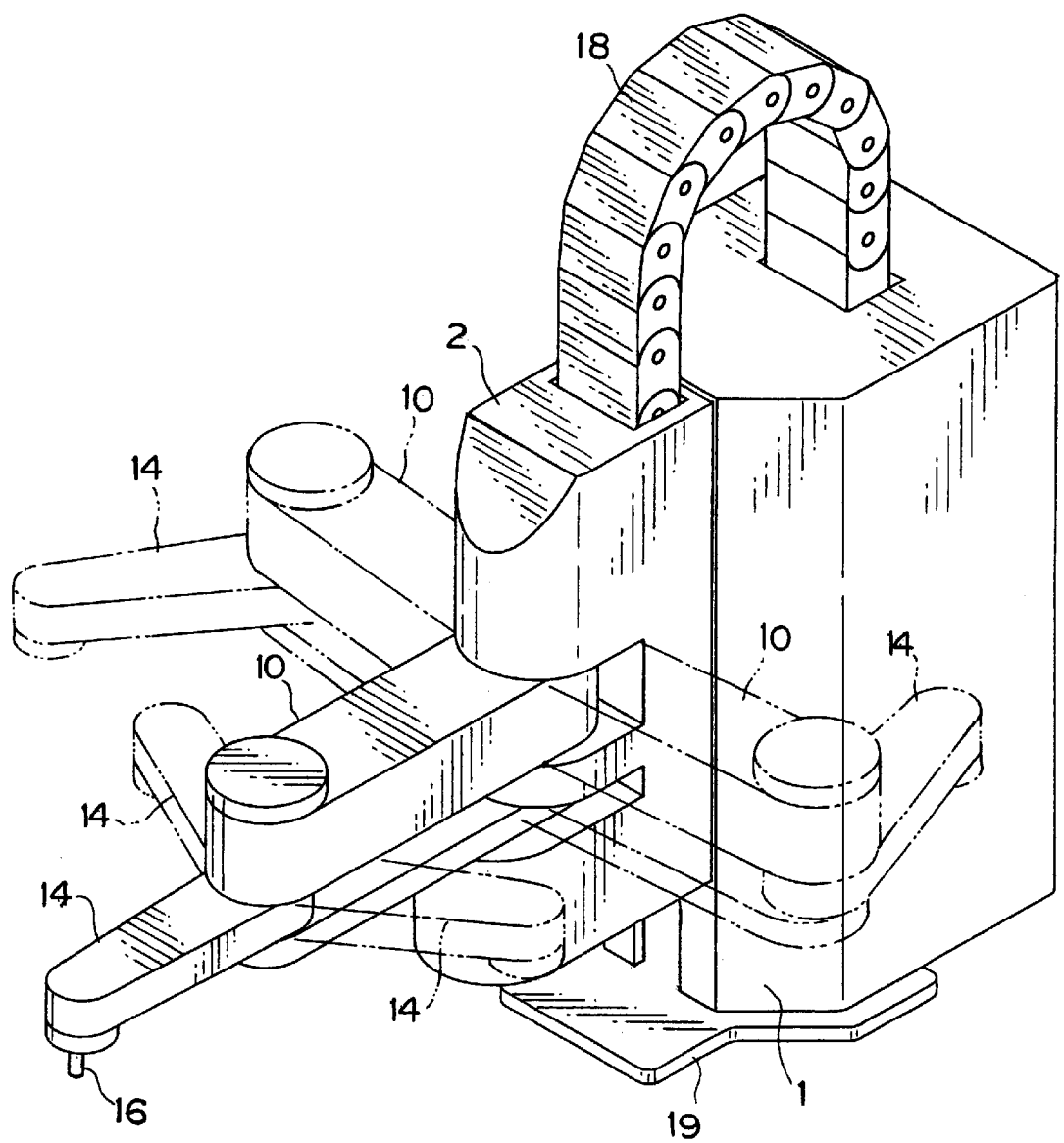
FIG. 5 is a perspective view of the robot, partly in phantom depiction, showing the jointed operating parts as being movable.

In reference to FIGS. 1 and 5, the mount structure 2 supports a first operating arm 10, a stepping motor 11 for rotationally drive the first arm 10 and a reduction gear 12 operatively connected to the stepping motor 11. The first operating arm 10 has a pair of spaced pulleys 13 which are connected to each other by a transmission belt. A second operating arm 14 is rotatably supported on the free end of the first operating arm 10 and is rotationally driven by a stepping motor 15. A rotation shaft 16 is mounted on the free end of the second operating arm 14 and is operatively connected to a stepping motor 17 so as to be rotated thereby. The robot 1 further includes a flexible casing 18 for containing the electric wires therein connecting the so many stepping motors to a power supply. Further, the robot 1 includes a base 19 for positionally stabilizing the robot 1. The robot 1 is operated by a control section (not shown) which is separately provided.

Though not shown, the aforementioned series of tension coil springs may be replaced by a single tension coil spring for balancing the weight of the mount structure 2. In this case, one end of the single tension coil spring is anchored to the bottom of the robot 1 and the opposite end of the spring is connected to the bracket 9 in the same manner as in the first embodiment of the invention while the intermediate portion of the single coil spring may be put into slide engagement with a pulley having an engaging groove of a capacity for receiving the corresponding diameter of coils of the tension coil spring, the pulley being arranged at an upper position in the robot 1 just as shown in FIG. 1.

The operation is as follows:

When the stepping motor 5 is driven, the threaded shaft 3 is rotated. Then the mount structure 2 is vertically moved along the threaded shaft 3. The series of tension coil springs are designed to have a tensile load of relatively small value in consideration of the mount structure 2 moving from up to down. More precisely, the length of the respective tension coil springs 6 is H as shown in when the mount structure 2 is at the upper most position as shown in FIG. 3 (A). In this case, the weight W of the mount structure 2 directed in the lower direction slightly exceeds the tension of the tension coil springs 6, and therefore the stepping motor 5 will have not so much load applied thereto in spite of the tension of the tension coil springs 6 when the stepping motor 5 is driven to move the mount structure 2 from up to down. On the contrary, when the mount structure 2 is at the lower most position as shown In FIG. 3 (B), the tension coil springs 6 are expanded and have a length H+h which represents the tension of the tension coil springs 6 to slightly exceed the weight W of the mount structure 2. Therefore the stepping motor 5 will have not so much load applied thereto in spite of the weight W of the mount structure 2 when the stepping motor 5 is driven to move the mount structure from down to up. Thus the spring balancing device A is so designed in relation to the weight W of the mount structure 2 as to give a substantially invariable load to the stepping motor 5 when the stepping motor 5 is driven to move the mount structure 2 from up to down and from down to up in the vertical directions.

What is claimed is:

1. A multi-joint robot comprising a vertical threaded shaft, a mount structure having a bracket and operatively connected to said threaded shaft, a stepping motor for rotationally driving said threaded shaft for vertically moving said mount structure along said threaded shaft between an upper most position and a lower most position, balancing means including tension coil spring means and a pulley, said tension coil spring means being arrayed in an elongated course, an end of said course being anchored to a bottom of said robot and an opposite end of said course being connected to said bracket of said mount structure, an intermediate part of said coil spring course passing in sliding engagement on said pulley which is arranged at an upper location on said robot above said bracket of said mount structure, so that said tension coil spring means is expanded when said mount structure is at a position below said upper most position.

2. A multi-joint robot as defined in claim 1, wherein said tension coil spring is characterized by having a relatively small spring constant representing a relatively small tensile load so that said stepping motor has a constant load applied thereto when said stepping motor is driven to vertically move said mount structure between said upper most position and said lower most position.

3. A multi-joint robot comprising a vertical threaded shaft, a mount structure having a bracket and operatively connected to said threaded shaft, a stepping motor for rotationally driving said threaded shaft for vertically moving said mount structure along said threaded shaft between an upper most position and a lower most position, and balancing means including at least two tension coil springs which are connected in series by means of an intermediate wire and a pulley, said series of tension coil springs at course ends thereof having an end anchored to a bottom of said robot, an opposite course end being connected to said bracket of said mount structure, said intermediate wire being in sliding engagement with said pulley, said pulley being arranged at an upper location on said robot above said bracket of said mount structure, so that said series of tension coil springs is expanded when said mount structure is at a position below said upper most position.

4. The multi-joint robot as defined in claim 3 wherein said series of tension coil springs are made of a wire having a predetermined diameter, coils of a same diameter and a same unit length, and have a relatively small spring constant representing a relatively small tensile load so that said stepping motor has a constant load applied thereto when said stepping motor is driven to vertically move said mount structure between said upper most position and said lower most position.

5. The multi-joint robot comprising a vertical threaded shaft, a mount structure having a bracket and operatively connected to said threaded shaft, a stepping motor for rotationally driving said threaded shaft for vertically moving said mount structure along said threaded shaft between an upper most position and a lower most position, and balancing means including at least three tension coil springs which are connected in series by means of first and second intermediate wires and first and second pulleys, said series of tension coil springs at a course end thereof having an end anchored to a top of said robot, an opposite course end being connected to said bracket of said mount structure, said first intermediate wire being in sliding engagement with said first pulley, said first pulley being arranged at an upper location on said robot above said bracket of said mount structure and adjacent to said top thereof, said second intermediate wire being in sliding engagement with said second pulley, said second pulley being arranged at a lower part of said robot adjacent to a bottom thereof, so that said series of tension coil springs is expanded when said mount structure is at a position below said upper most position.

6. The multi-joint robot as defined in claim 5 wherein said series of tension coil springs are made of a wire having a predetermined diameter, coils of a same diameter and a same unit length, and have a relatively small spring constant representing a relatively small tensile load so that said stepping motor has a constant load applied thereto when said stepping motor is driven to vertically move said mount structure between said upper most position and said lower most position.

* * * * *